(12) United States Patent
Xu

(10) Patent No.: US 9,726,960 B2
(45) Date of Patent: Aug. 8, 2017

(54) EXTERNAL LIGHTING DEVICE AND SYSTEM FOR HANDHELD SMART DEVICES

(71) Applicant: Ye Xu, Sugar Land, TX (US)

(72) Inventor: Ye Xu, Sugar Land, TX (US)

( * ) Notice: Subject to any disclaimer, the term of this patent is extended or adjusted under 35 U.S.C. 154(b) by 0 days.

(21) Appl. No.: 14/918,742

(22) Filed: Oct. 21, 2015

(65) Prior Publication Data

US 2016/0109784 A1   Apr. 21, 2016

Related U.S. Application Data

(60) Provisional application No. 62/066,442, filed on Oct. 21, 2014.

(51) Int. Cl.
*H04N 5/225* (2006.01)
*G03B 15/03* (2006.01)
*G03B 15/05* (2006.01)

(52) U.S. Cl.
CPC .......... *G03B 15/03* (2013.01); *H04N 5/2256* (2013.01); *G03B 15/05* (2013.01); *G03B 2215/0539* (2013.01); *G03B 2215/0567* (2013.01)

(58) Field of Classification Search
None
See application file for complete search history.

(56) References Cited

U.S. PATENT DOCUMENTS

| | | | | |
|---|---|---|---|---|
| 8,428,644 B1* | 4/2013 | Harooni | ............... | H04B 1/3888 362/551 |
| 9,110,355 B1* | 8/2015 | Nourbakhsh | .......... | G03B 15/05 |
| 2006/0215400 A1* | 9/2006 | Lewis | ................ | G01N 21/8806 362/233 |
| 2012/0243860 A1* | 9/2012 | Yang | ...................... | G03B 15/05 396/199 |
| 2012/0257370 A1* | 10/2012 | Yang | ...................... | G03B 15/02 362/11 |
| 2013/0121677 A1* | 5/2013 | Yeh | ........................ | G03B 15/05 396/176 |
| 2013/0201653 A1* | 8/2013 | Shoemake | ............. | G03B 15/02 362/3 |
| 2013/0301235 A1* | 11/2013 | Harooni | ................ | G03B 15/02 362/11 |
| 2014/0055978 A1* | 2/2014 | Gantz | .................... | A45C 11/00 362/8 |
| 2014/0226300 A1* | 8/2014 | O'Neill | .................. | G03B 15/06 362/18 |
| 2015/0334258 A1* | 11/2015 | O'Neill | ................ | H04N 5/2257 348/207.1 |

* cited by examiner

*Primary Examiner* — Justin P Misleh
(74) *Attorney, Agent, or Firm* — Benjamin Aaron Adler

(57) ABSTRACT

Provided herein are devices for enhancing the quality of photo shooting using a camera integrated into a handheld smart device, such as a smartphone. An external lighting device comprises a base plate removably securable to a mount on the smart device, a connecting structure disposed at the edge of the top surface of the base plate and a ring-like turntable rotatably connected on the base plate via the connecting structure and a plurality of LED lights on the top surface of the turntable. When secured on the body of the smart device, the ring-like turntable rotates to a position where the LED lights surround the cameras to provide adjustable lighting. Further provided is a handheld camera system comprising a smart device, the external lighting device as described above and a protective case with a mount to attached to the lighting device.

14 Claims, 7 Drawing Sheets

US 9,726,960 B2

EXTERNAL LIGHTING DEVICE AND SYSTEM FOR HANDHELD SMART DEVICES

BACKGROUND OF THE INVENTION

Field of the Invention

The present invention relates generally to the filed of accessories for handheld smart electronic devices. More specifically, the present invention relates to an external lighting device that can be attached to a smart electronic device, such as a smartphone.

Description of the Related Art

Nowadays, cell phone and other smart electronic smart devices have gradually become daily necessities. Currently, most of the cell phones/smart devices in the market are equipped with cameras. More and more smart device users are taking photos or shooting videos using the cameras integrated in these smart devices. However, due to dimensional and/or structural limits for these devices to integrate camera accessories, the functionality of these cameras on the smart devices are still limited, especially in the aspect of lighting. Thus, the quality of photo or video shooting using smart device cameras is heavily dependent on the surroundings. More specifically, when the natural lighting in the surroundings is too bright or too dark, it becomes extremely difficult for smart device users to take high quality photos.

Some cell phones/smart devices are accessorized with a singular LED light to partially function as flash and compensate the natural lighting. However, these types of LED lights usually provide lighting of white color from one singular point on the cell phone/smart device, resulting in unevenly distributed lighting and non-adjustable color temperature for the photo or video shooting. Other users utilize hand held external light sources, such as a flashlight, to provide extra lighting for the camera on cell phones/smart devices when taking photos in a dark environment, but it is highly inconvenient to hold both a cell phone/smart device and an external light source.

Therefore, there is a recognized need in the art for an external light source that can attach to a cell phone/smart device, providing evenly distributed lighting with adjustable color temperature and brightness for the camera on the smart device. Particular, the prior art is deficient in devices comprising a light source that is attachable to a cell phone/smart device and providing evenly distributed and adjustable lighting. The present invention fulfills this longstanding need and desire in the art.

SUMMARY OF THE INVENTION

The present invention is directed to an external lighting device for a smart device. The external lighting device comprises a base plate having a substantially circular body removably securable to a mount on the smart device or a protective case thereof. A connecting structure is disposed at an edge of a top surface of the base plate and a ring-like turntable is in rotatable connection with the base plate via the connecting structure. A plurality of LED lights is evenly distributed on the ring-like turntable. In use, the ring-like turntable with LED lights rotates over the camera on the cell phone/smart device and the LED lights on the turntable surround the camera to provide evenly distributed lighting.

The present invention is directed further to a handheld camera system. The system comprises a smart device, a protective case for the smart device with a mount formed on a back side thereof and the external lighting device removably securable to the mount as described herein.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
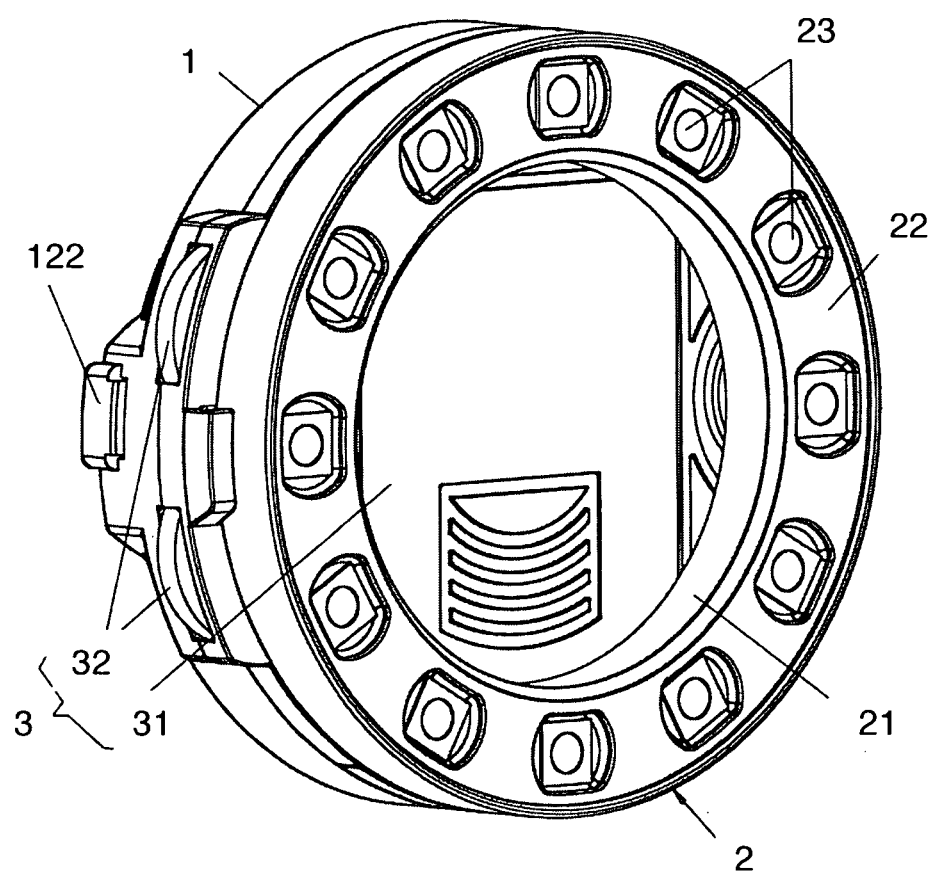
FIG. 1 is a perspective view of the external lighting device from front side of the device showing the ring-like turntable with LED lights and a base plate.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention, there is provided an external lighting device for a smart device. This device comprises a base plate having a substantially circular body removably securable to a mount on the smart device or a protective case thereof; a connecting structure disposed at an edge of a top surface of the base plate; a ring-like turntable in a rotatable connection with the base plate via the connecting structure; and a plurality of LED lights disposed on a top surface of the turntable.

In this embodiment, the ring-like turntable comprises a flanged hook disposed on the side surface of the turntable on an opposite end to the connecting structure; and a pin disposed on the bottom surface of the turntable proximate to the connecting structure.

In this embodiment, the base plate comprises a power module in connection with the LED lights; a stopping mechanism for constraining the range of motion of the turntable; engaging means for removably engaging a mount on a case for the smart device, disposed on the bottom surface thereof removably securable to the mount on the smart device; and a release mechanism disposed on a side surface of the base plate proximate to the engaging means.

Furthermore in this embodiment, the power module comprises a battery compartment disposed in the base plate having a removable cover forming part of the top surface of the base plate; a switch disposed on the side surface of the base plate in connection with the battery compartment to turn on or off the LED lights on the turntable; and at least one brightness controller for the LED lights disposed on the side surface of the base plate.

Further still in this embodiment, the stopping mechanism for the external lighting device comprises an L-shaped slot within which the flanged hook fits disposed on the opposite end to the connecting structure; a U-shaped groove within which the pin is slidable disposed on the top surface of the base plate proximate to the connection for the turntable and the base plate.

In this embodiment, the L-shaped slot of the base plate comprises an open end and a closed end. The closed end of the L-shaped slot is a stop for the flanged hook. The U-shaped groove of the base plate comprises two closed ends between which the pin on the turntable slides.

Further still in this embodiment, the mount on the smart device comprises a substantially circular body having an open top surface; and means for receiving the engaging means on the base plate of the external lighting device. The receiving means on the mount comprises at least two pairs of L-shaped slots each comprising an open end and a closed end.

Still in this embodiment, the engaging means of the external lighting device comprises at least two pairs of flanged hooks formed where the side surface meets the bottom surface of the base plate. Each pair of the flanged hooks are disposed at opposite sides of the bottom surface of the base plate. The flanged hooks of the receiving means are slidable into the L-shaped slots of the mount through the open end thereof.

Further still in this embodiment, the release mechanism of the external lighting device comprises a release button with a flanged end, the release button disposed on the side surface of the base plate with the flanged end extendable into the engaging means. The base plate is secured to the mount when the flanged hooks of the engaging means abut the inner surface of the closed end of the L-shaped slots and the flanged end of the release button abuts the outer surface of the closed end for the L-shaped slots of the mount. When the release button is pushed, the flanged end thereof retracts into the base plate such that the flanged hooks of the engaging means are releasable from the L-shaped slots of the mount.

In another embodiment of the present invention, there is provided a handheld camera system comprising a smart device having a camera disposed on the back side thereof; a protective case for the smart device comprising a mount formed thereon; and the external lighting device as described supra removably securable to the mount. Representative examples for the smart device include but are not limited to a smartphone, or a tablet computer.

In this embodiment, the mount formed on the back side of the protective case comprises a substantially circular body with an open top surface; and means for receiving the engaging means of the base plate of the external lighting device. The receiving means on the mount comprises at least two pairs of L-shaped slots, each L-shaped slot comprises an open end and a closed end.

Provided herein are external lighting devices and camera systems configured to enhance the camera functionality in a handheld cell phone or smart device. The external lighting device comprises a plurality of LED lights on a ring-like turntable, a base plate, power module and control module. Removably attached or secured to the cell phone/smart device, a user has a system configured to quickly and easily adjust the parameters of lighting to enhance a photographic or videographic opportunity. For example, the LED lights may emit light with colors of, including but not limited to, yellow, white or blue.

One particular system comprises a rotatable ring-like turntable structure having plurality of LED lights on it and a mount disposed on the cell phone/smart device. The external lighting device comprises a base or base plate structurally configured to removably attach to the mount. Generally, the external lighting device is substantially circular and has a diameter about that of, but no greater than, the width of the mount on the cell phone/smart device. Neither the base plate nor the mount exceeds the length and with of the surface of the cell phone/smart device so that the external lighting device, when attached to the mount, does not restrict a user's holding the cell phone/smart device. Furthermore, the components of the external lighting device can be manufactured from light-weight, but sturdy materials, enabling convenience for carrying it along with the cell phone/smart device.

The external lighting device is easily attached to or secured to and removable from the mount as described herein. When attached or secured to the smart device, the ring-like turntable with LED lights can rotate over the camera with the LED lights surrounding the camera. When not in use, the ring-like turntable rotates back to the position such that the turntable is substantially coincident with the top surface of the base plate.

The external lighting device comprises means to restrain the rotating angle of the turntable in the range of from about 0° to about 135°. More specifically, at the proximate position of the connecting structure between the base plate and the ring-like turntable, there is provided a U-shaped groove on the top surface of the base plate guiding the motion of a pin located on the bottom of the turntable, restraining motion range of the turntable. An L-shaped slot is located on the opposite end to the U-shaped groove on the top surface of the base plate. When the turntable rotates back to the base plate from the camera, a flange structure on the turntable slides inside and fully engages the L-shaped slot. When the turntable rotates towards the camera, the ring-like turntable stops at the position such that the camera is substantially in the center of the ring-like turntable. When the turntable is turned back to the base plate, it stops at the position in which the ring-like turntable substantially coincident with the top surface of the base plate.

The base plate of the lighting device comprises means, such as, but not limited to, slots or slot-like mechanisms to engage the mount with a twist of the device. The mount is disposed on the smart device proximate to the camera and has dimensions not exceeding the surface dimensions of the smart device. The mount comprises a complementary means or mechanism to that on the bottom surface of the base plate to receive and engage with the mechanism on the device.

The power module comprises a battery compartment in the base plate and electrical wires which pass through the connecting structure between the ring-like turntable and base plate to provide power for the LED lights on the ring-like turntable, an on/off switch to turn on and off the LED lights and at least one thumb switch to adjust the brightness of the LED lights.

Alternatively, the mount may be formed on a protective case as on the smart device. The smart device may be able to slide in the protective case which may have dimensions sufficient to cover the back of the smart device with an opening that aligns with the camera.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 is a perspective view of the external lighting device with a front view showing a base plate 1 and a turntable 2 having a ring-like structure 22 with LED lights 23 on it. There is a battery compartment 31 located on the top surface of the base plate 1. The power module 3 comprises the battery compartment 31, at least one thumb switch 32 and an on/off switch to turn on or off the LED lights 23. A release button (with a flanged end) 122, which is located on the side surface and near the bottom of the base plate 1 is configured to secure and release the external lighting device from the mount on a smart device.

Figure 2:
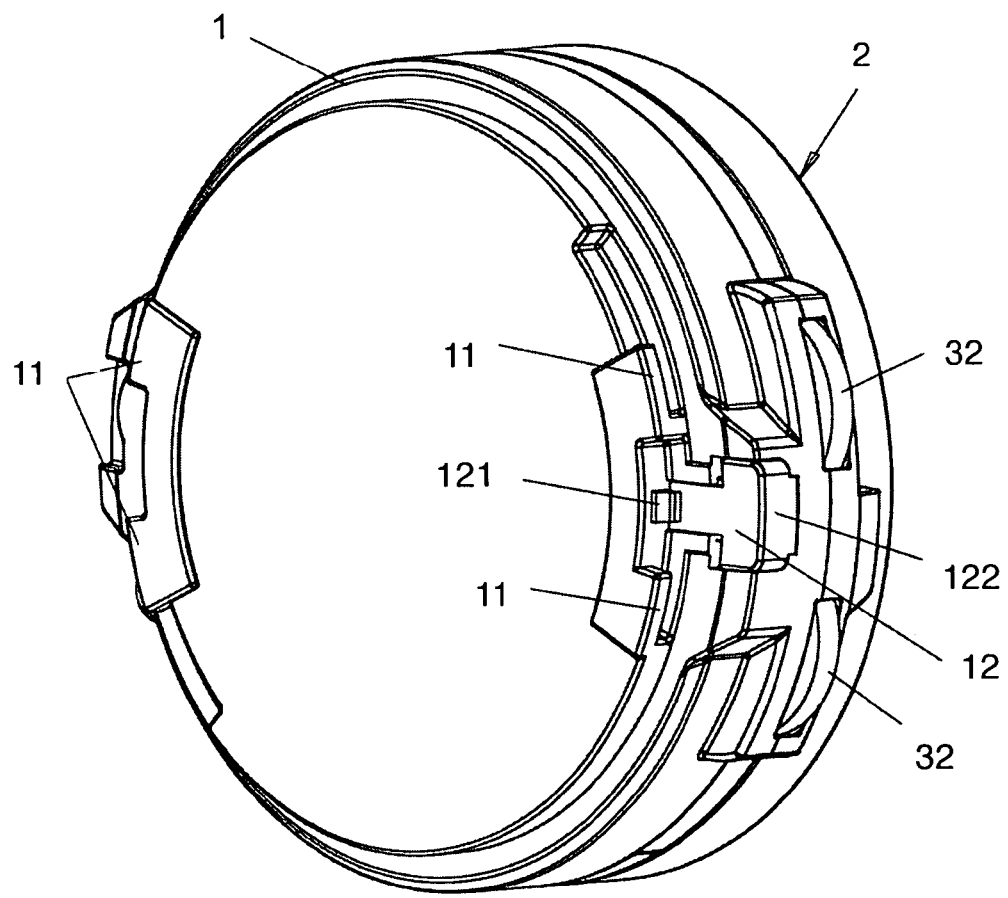
FIG. 2 is a perspective view of the external light source with a back view showing the fixture structure and switches to adjust the brightness of the LED lights.

FIG. 2 is a perspective view from the back side of the external lighting device. On the bottom surface of the base plate, there are two pair of flanged hooks 11 as the engaging means for a mount, such as L-shaped hooks or reverse L-shaped hooks disposed in opposite sides of the bottom surface and proximate to the release button 122 and the connecting structure (or connection structure) for the turntable and base plate, respectively. The release button 122, which points to the center of the base plate, has a flanged end 121 disposed on the bottom surface 12 of the release button. When the external lighting device is engaged in the mount, the release button is relaxed and the flanged end fits next to the closed end of the receiving means (L-shaped slots) 102 (see FIG. 4) in the mount, stopping the flanged hooks 11 from sliding out of the receiving means 102. When the release button 122 is pushed, the flanged end slides away from the receiving means, enabling the external lighting device to slide out of the mount. Two circular thumb switches are located above the release button on the side surface of the base plate. Each thumb switch controls the brightness of one group of LED lights on the ring-like turntable.

Figure 3:
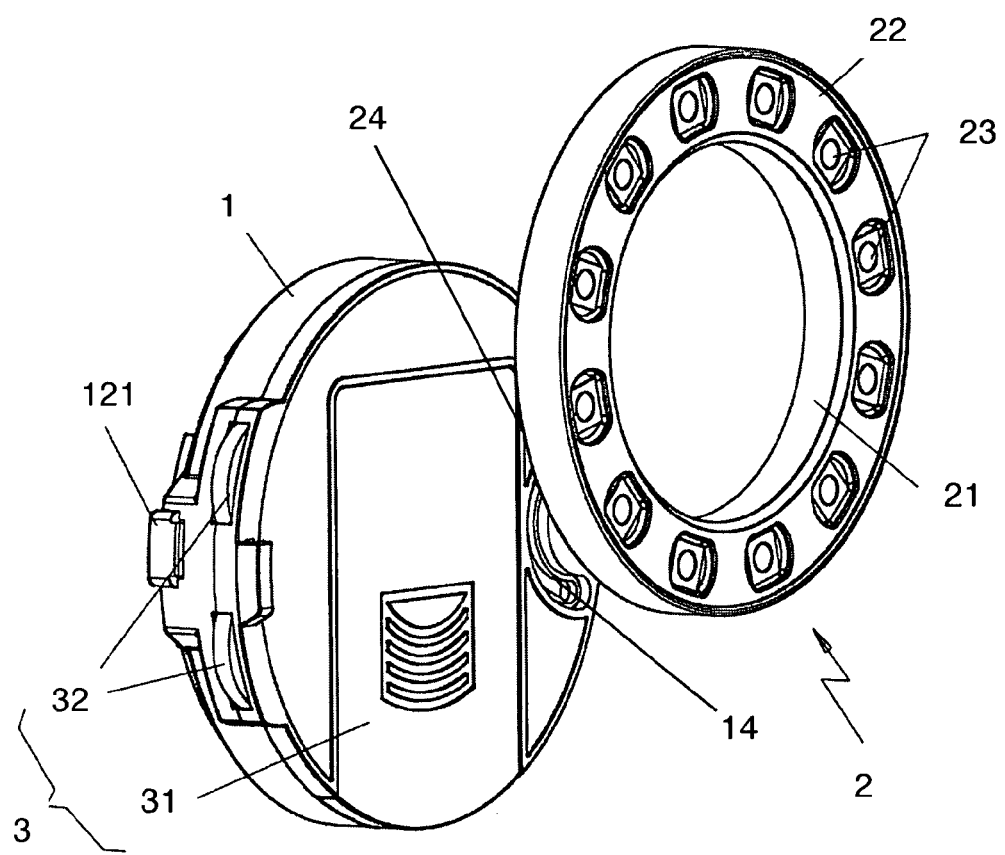
FIG. 3 is a perspective view of the external light source when the turntable with LED lights rotates away from the base plate, showing the battery chamber on the base plate and connecting structure between the ring-like turntable and the base plate.

FIG. 3 is a perspective view of the external lighting device from the front when the ring-like turntable 2 rotates away from the base plate 1. The battery compartment 31 located on the top surface of the base plate 1 is fully exposed. A user may slide open the cover of the compartment to change the battery. The central hole or opening 21 of the turntable 2 may align with the camera 101 with the LED lights 23 surrounding it. A U-shaped groove 14 is disposed one the top surface of the base plate, and a pin 24 is disposed on the bottom surface of the turntable slides in the U-shaped groove 14, limiting the range of the rotation for the turntable.

Figure 4:
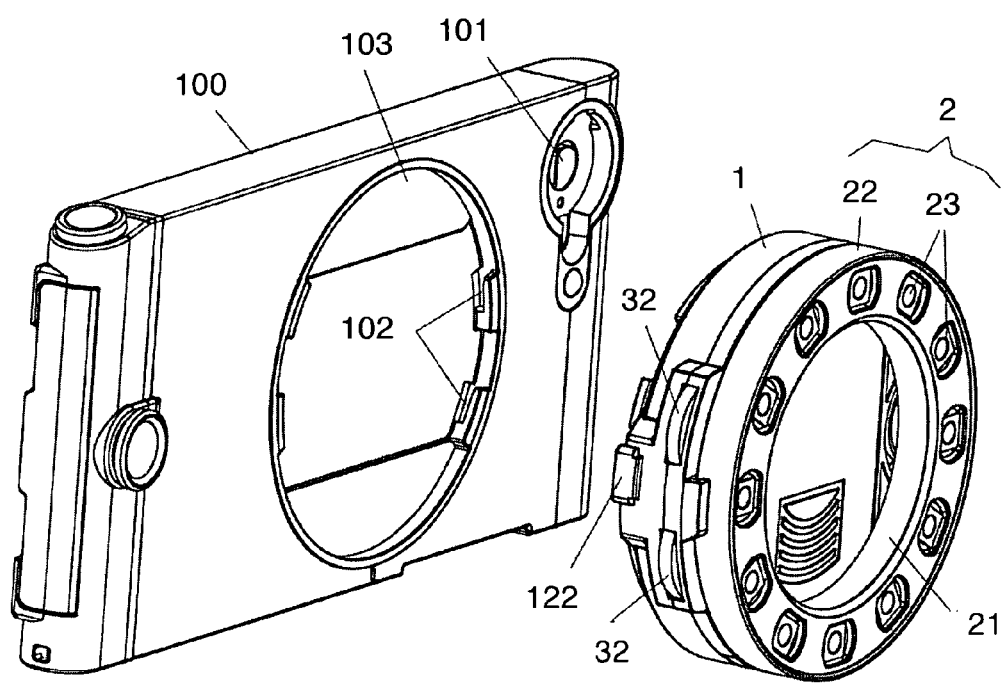
FIG. 4 is a perspective view of the handheld camera system when the external light source is dissembled from the cell phone/smart device case, on which the base plate can mount.

FIG. 4 is a perspective view of the handheld camera system, comprising a smart device 100 with an integrated camera 101, a protective case with a mount 103 formed on the back side and the external lighting device as described supra removably securable to the mount. The turntable 2 of the lighting device is substantially coincident with the base place 1 when not in use. The shape and dimension of flanged hooks 11 fit the receiving means 102 of the mount 103. The receiving means 102 comprise L-shaped slots with open ends and closed ends. When a user mounts the external lighting device on the mount 103, the L-shaped hooks (flanged hooks) 11 on the bottom of the base plate 1 slide into the receiving means 102 through the open end until they are stopped by the closed end. At the same time, the flanged end 121 of the release button 122 engages with the outer surface of the closed end, preventing the L-shaped hooks (flanged hooks) 11 from sliding out of the receiving means 102. Therefore, the external lighting device is secured on the mount 103.

Figure 5:
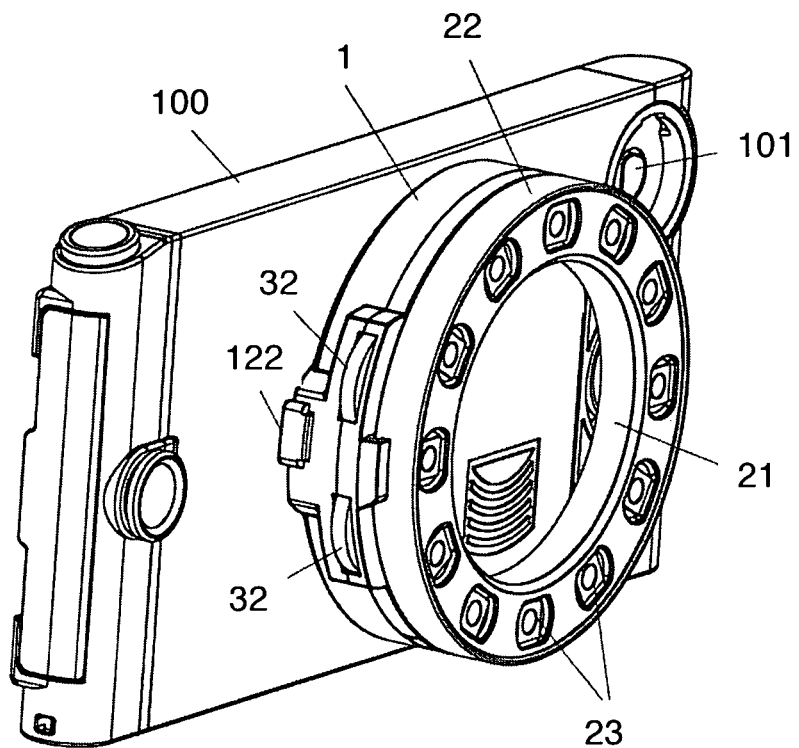
FIG. 5 is a perspective view of the handheld camera system when the external light source is mounted on the cell phone/smart device case.

FIG. 5 is a perspective view of the handheld camera system as described supra when the external lighting device is mounted and secured on the protective case 100 for the smart device. The ring-like turntable 2 coincides on the top of the base plate 1 while the external lighting device is not in use.

Figure 6:
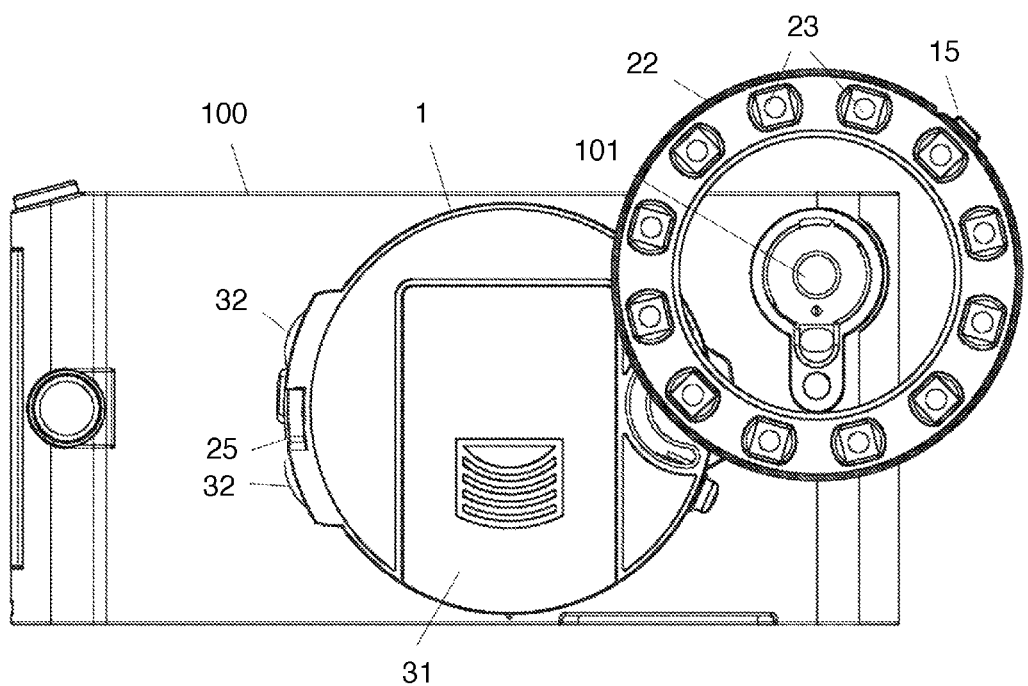
FIG. 6 is a front view of the handheld camera system when the ring-like turntable rotates over the camera on the cell phone/smart device with the LED lights surrounding the camera.

FIG. 6 is a front view of the handheld camera system as described supra when the external lighting device is in use. The turntable 2 rotates to a position where the central hole or opening 21 of the ring-like turntable 2 is aligned with the camera 101 of the smart device 100 such that the LED lights 23 surround the camera 101 with the camera 101 is substantially at the center of the ring-like turntable. A user may use the thumb switches 32 located on the side surface of the base plate to adjust the lighting parameters, such as color temperature, brightness, for the camera 101. A flanged hook 15 is disposed on the side surface of the turntable, and an L-shaped slot 25 is disposed on the edge of the top surface of the base plate. The flanged hook 15 slides in the L-shaped slot 25 to limit the range of rotation for the turntable.

Figure 7:
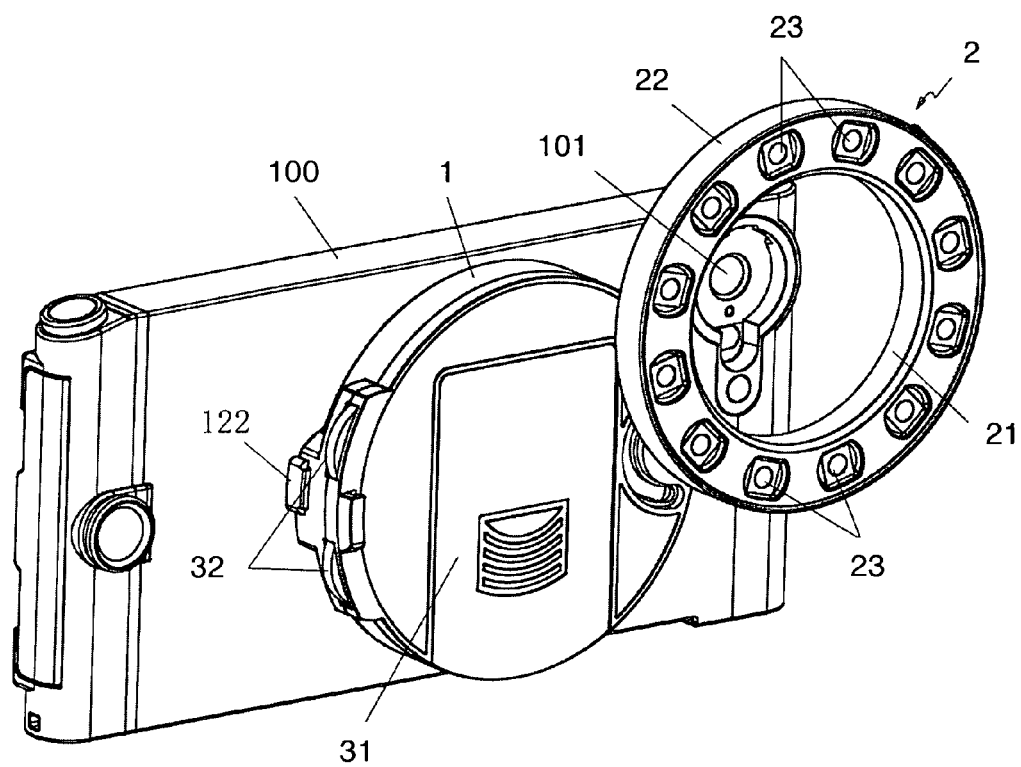
FIG. 7 is a perspective view of the handheld camera system when the external light source is mounted on the cell phone/smart device case and the ring-like turntable rotates over the camera one the cell phone/smart device with the LED lights surrounding the camera.

FIG. 7 is a perspective view of the handheld camera system as described supra when the external lighting device is in use. The turntable 2 rotates to a position where the central hole or opening 21 of the ring-like turntable 2 is aligned with the camera 101 of the smart device 100 such that the LED lights 23 surround the camera 101 with the camera 101 is substantially at the center of the ring-like turntable of the external lighting device. A user may use the thumb switches 32 located on the side surface of the base plate to adjust the lighting parameters, such as color temperature, brightness, for the camera 101. The release button 122 is located on the side surface of the base plate. When the release button 122 is pushed, the flanged end 121 thereof is driven away from the receiving means 102 of the mount 103, allowing the flanged hooks or L-shaped hooks 11 on the base plate to rotate out of the receiving means 102 and disengage from the mount 103 (See FIG. 4).

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. An external lighting device for a smart device, comprising:
 a base plate comprising:
  a substantially circular body removably securable to a mount on the smart device or a protective case thereof;
  a U-shaped groove disposed at an edge of a top surface of said base plate;
  an L-shaped slot disposed on the top surface oppositely to the U-shaped groove; and
  a power module; and
 a ring-like turntable in rotatable connection with the base plate comprising:
  a pin on a bottom surface of the turntable disposed within the U-shaped groove on the base plate and slidable therewithin;
  a flanged hook disposed on a side surface of the turntable oppositely to the pin and slidable in the L-shaped slot of the base plate; and
  a plurality of LED lights disposed on a top surface of the turntable in connection with the power module.

2. The external lighting device of claim 1, wherein the base plate further comprises:
 at least two pairs of flanged hooks formed where a side surface of the base plate meets a bottom surface thereof, said at least two pairs of flanged hooks removably engageable with the mount; and
 a release mechanism disposed on the side surface of the base plate proximate to at least one pair of said at least two pairs of flanged hooks.

3. The external lighting device of claim 2, wherein the mount comprises:
 a substantially circular body having an open top surface; and
 at least two pairs of L-shaped slots each comprising an open end and a closed end, said at least two pairs of flanged hooks on the base plate slidable into the open ends thereof.

4. The external lighting device of claim 3, wherein the release mechanism comprises a release button with a flanged end, said release button disposed on the side surface of the base plate with the flanged end engageable with an outer surface of the closed end of the L-shaped slots.

5. The external lighting device of claim 4, wherein said base plate is secured to the mount when the flanged hooks fit into L-shaped slots of the mount and the flanged end of the release button is against the outer surface of the closed end for said L-shaped slots.

6. The external lighting device of claim 5, wherein, when the release button is pushed, the flanged end thereof retracts into the base plate such that the flanged hooks are releasable from the L-shaped slots of the mount.

7. The external lighting device of claim 2 wherein each pair of said flanged hooks are disposed at opposite sides of the bottom surface of the base plate.

8. The external lighting device of claim 1, wherein the power module comprises:
 a battery compartment disposed in the base plate having a removable cover forming part of the top surface of the base plate;
 a switch disposed on a side surface of the base plate in connection with the battery compartment to turn on or off the LED lights on the turntable; and
 at least one brightness controller for the LED lights disposed on the side surface of the base plate.

9. The external lighting device of claim 1, wherein said L-shaped slot comprises an open end and a closed end.

10. The external lighting device of claim 9, wherein said closed end of the L-shaped slot is a stop for the flanged hook.

11. The external lighting device of claim 1, wherein the U-shaped slot comprises two closed ends between which said pin on the turntable slides.

12. A handheld camera system, comprising:
 a smart device comprising a camera;
 the external lighting device of claim 1; and
 said protective case for said smart device, said protective case having the mount removably secured thereon.

13. The handheld camera system of claim 12, wherein the smart device is a smartphone or a tablet computer.

14. The handheld camera system of claim 12, wherein the mount comprises:
 a substantially circular body with an open top surface; and
 at least two pairs of L-shaped slots each comprising an open end and a closed end.

* * * * *